United States Patent
Nakano et al.

(10) Patent No.: US 10,883,195 B2
(45) Date of Patent: Jan. 5, 2021

(54) METHOD OF PRODUCING ACRYLIC FIBER BUNDLE AND METHOD OF PRODUCING CARBON FIBER BUNDLE

(71) Applicant: Toray Industries, Inc., Tokyo (JP)

(72) Inventors: Masaki Nakano, Ehime (JP); Kengo Hayashida, Ehime (JP); Hirotada Endo, Ehime (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 16/480,884

(22) PCT Filed: Jan. 30, 2018

(86) PCT No.: PCT/JP2018/003008
§ 371 (c)(1),
(2) Date: Jul. 25, 2019

(87) PCT Pub. No.: WO2018/143210
PCT Pub. Date: Aug. 9, 2018

(65) Prior Publication Data
US 2019/0390370 A1   Dec. 26, 2019

(30) Foreign Application Priority Data
Feb. 1, 2017 (JP) .................... 2017-016467

(51) Int. Cl.
*B08B 3/04* (2006.01)
*D01D 5/06* (2006.01)
(Continued)

(52) U.S. Cl.
CPC ............. *D01D 10/06* (2013.01); *B08B 3/041* (2013.01); *B08B 3/048* (2013.01); *C01B 32/05* (2017.08);
(Continued)

(58) Field of Classification Search
CPC  B08B 3/04; B08B 3/041; B08B 3/048; C01B 32/05; D01D 5/06; D01D 10/06;
(Continued)

(56) References Cited

U.S. PATENT DOCUMENTS

| 2,790,698 A | 4/1957 | Robertson et al. |
| 3,558,765 A * | 1/1971 | Bruner et al. ............ D01F 6/18 264/233 |

(Continued)

FOREIGN PATENT DOCUMENTS

| JP | 59-36716 A | 2/1984 |
| JP | 08-246222 A | 9/1996 |

(Continued)

*Primary Examiner* — Leo B Tentoni
(74) *Attorney, Agent, or Firm* — DLA Piper LLP (US)

(57) ABSTRACT

A method produces an acrylic fiber bundle that are cleaned in one or more washing baths including an inflow portion and an outflow portion for a cleaning solution; at least one of the washing baths is a counterflow washing bath in which the cleaning solution flows into from the inflow portion located at a lower stream side position of a traveling direction of coagulated thread bundles, and flows out from the outflow portion located at an upper stream side position of the traveling direction of the coagulated thread bundles; and an average of coefficients of variation CV of linear speeds of the cleaning solution in the inflow portion of the counterflow washing bath is 0.30 or less, and an average of coefficients of variation CV of linear speeds of the cleaning solution in the outflow portion of the counterflow washing bath is 0.30 or less.

8 Claims, 5 Drawing Sheets

(51) Int. Cl.
*D06B 3/04* (2006.01)
*D06M 11/05* (2006.01)
*D06M 13/248* (2006.01)
*D01D 10/06* (2006.01)
*D01F 6/18* (2006.01)
*D01F 9/22* (2006.01)
*C01B 32/05* (2017.01)

(52) U.S. Cl.
CPC ............... *D01F 6/18* (2013.01); *D01F 9/22* (2013.01); *D10B 2101/12* (2013.01); *D10B 2321/10* (2013.01)

(58) Field of Classification Search
CPC ... D01F 6/18; D01F 9/22; D06B 3/04; D06M 11/05; D06M 13/248; D10B 2101/12; D10B 2321/10
USPC .......... 264/29.2, 29.6, 178 F, 180, 182, 184, 264/211.14, 211.15, 233; 8/137, 137.5, 8/147, 151; 134/15, 32, 34; 423/447.6, 423/447.7

See application file for complete search history.

(56) References Cited

U.S. PATENT DOCUMENTS 4,695,415 A * 9/1987 Setsuie ............... D01F 6/18
264/182
2015/0274860 A1* 10/2015 Sako ............... D01F 9/21
428/367

FOREIGN PATENT DOCUMENTS

| JP | 2005-171447 A | 6/2005 |
| JP | 2008-088616 A | 4/2008 |
| JP | 2008-095256 A | 4/2008 |

* cited by examiner

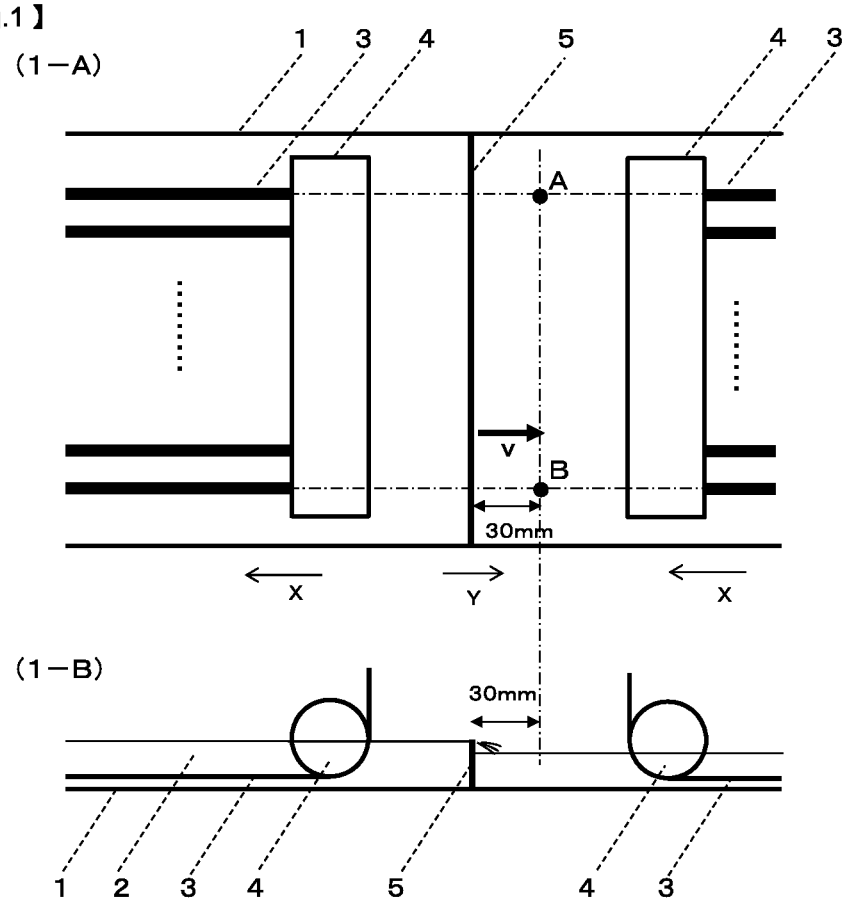

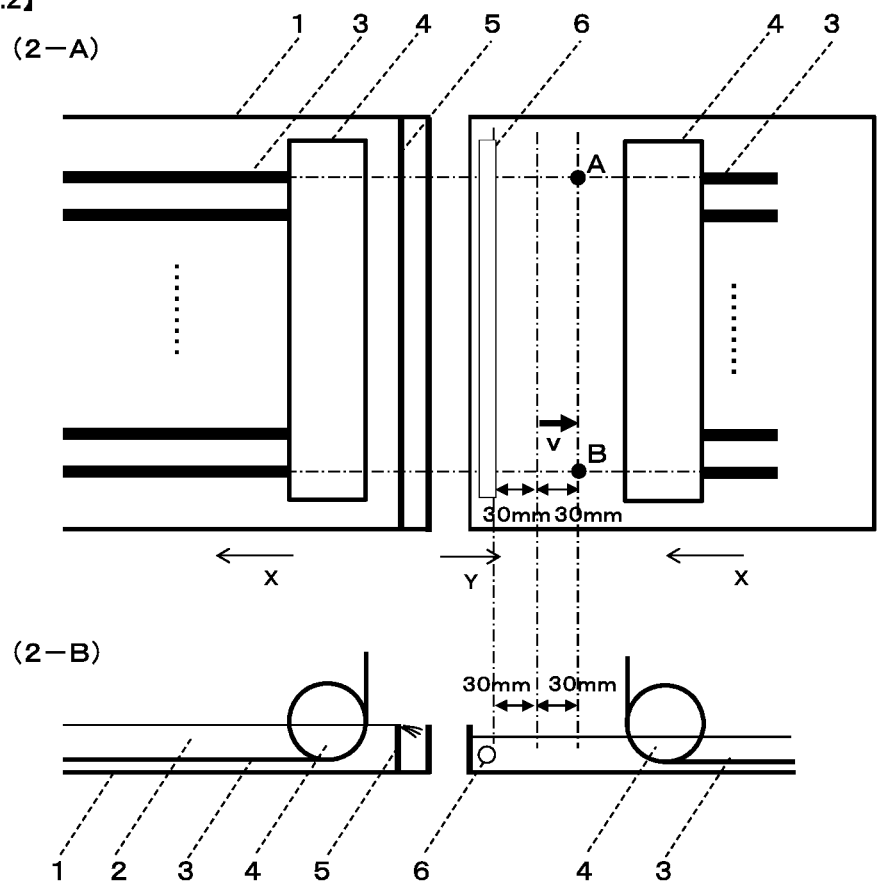

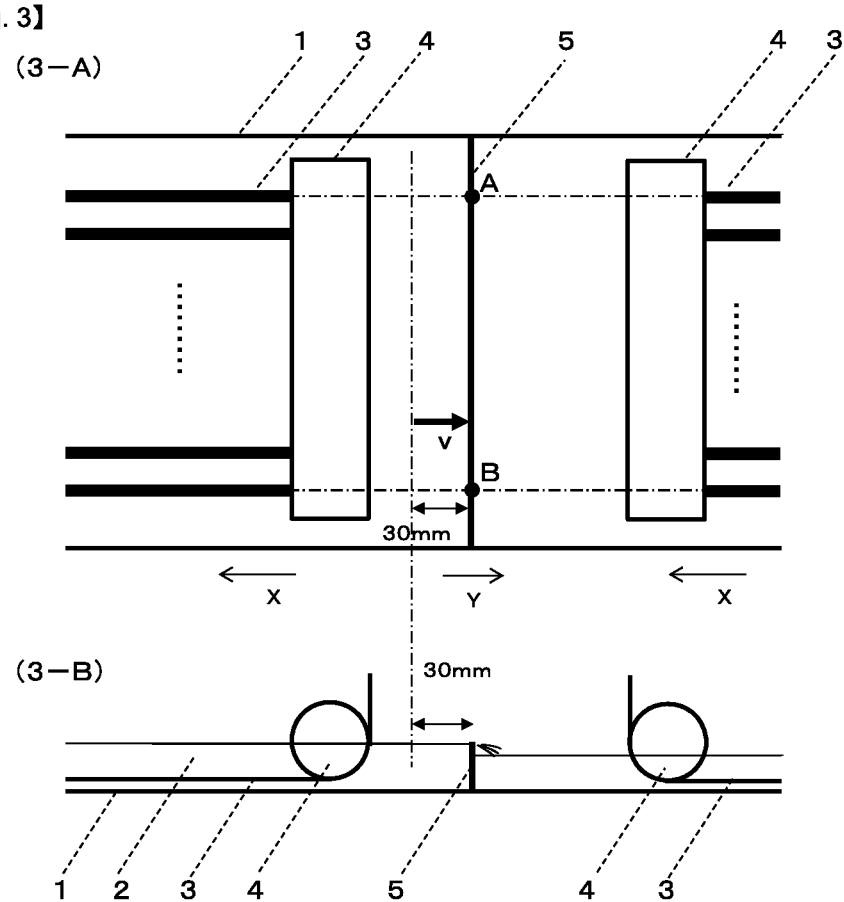

[Fig. 4]
(4-A)
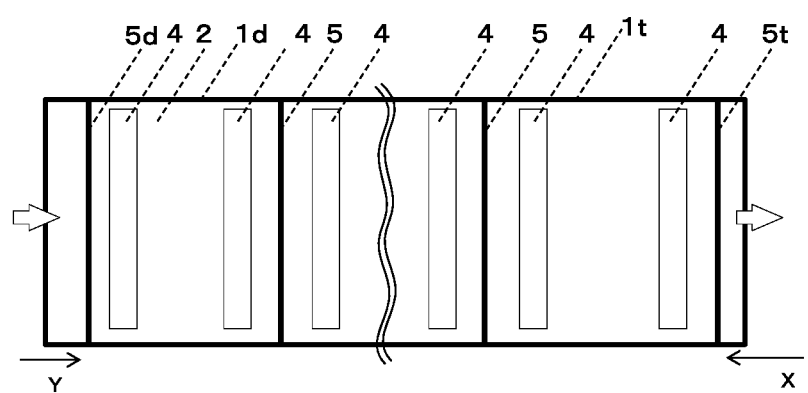
(4-B)
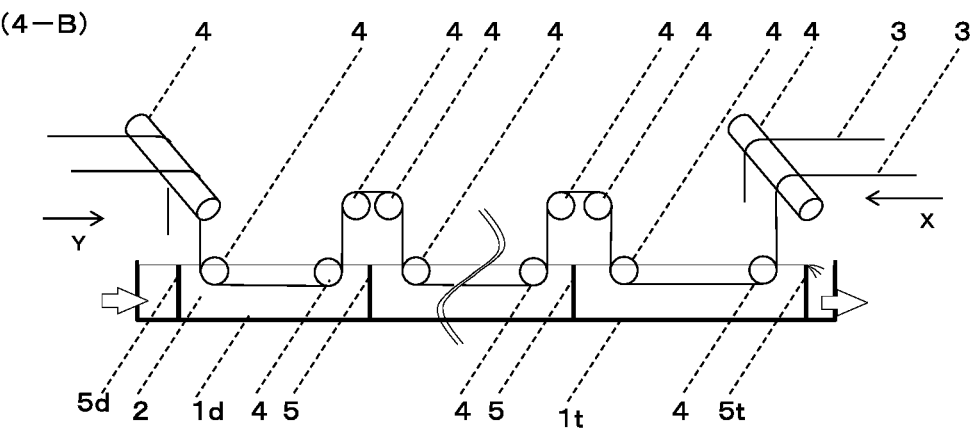

[Fig. 5]
(5-A)
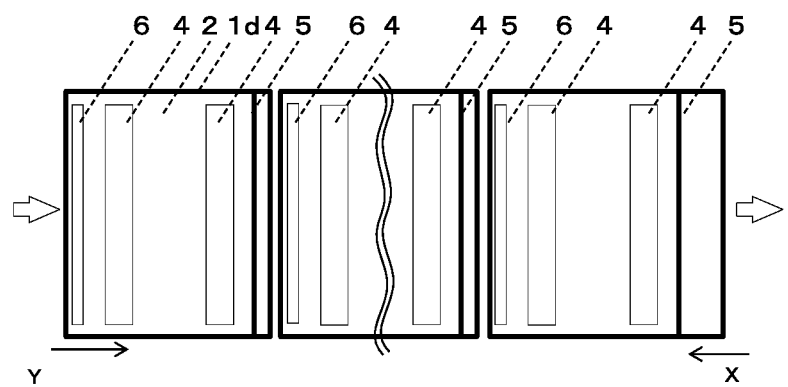
(5-B)
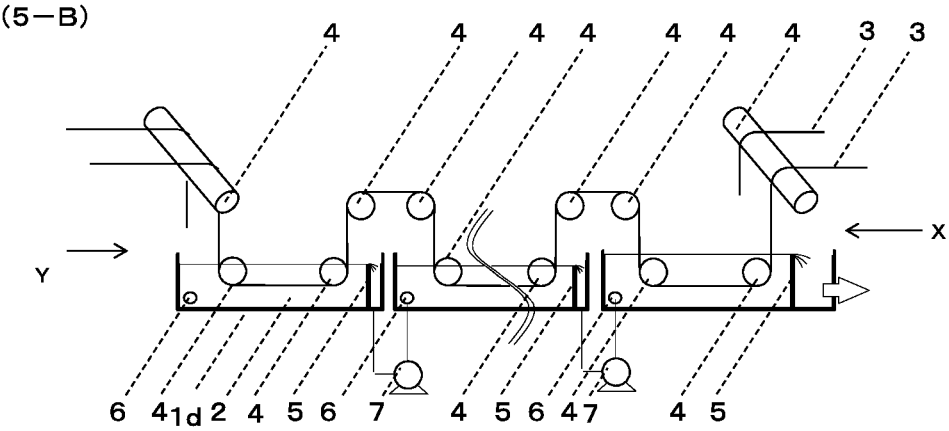

METHOD OF PRODUCING ACRYLIC FIBER BUNDLE AND METHOD OF PRODUCING CARBON FIBER BUNDLE

TECHNICAL FIELD

This disclosure relates to a method of producing an acrylic fiber bundle and a method of producing a carbon fiber bundle, particularly to a method of producing an acrylic fiber bundle having excellent processability during producing and an excellent quality even when the acrylic fiber bundle is formed into a thick thread bundle or a multiple thread bundle to improve productivity, and a method of producing a carbon fiber bundle using the acrylic fiber bundle.

BACKGROUND

Acrylic fibers have been widely used as precursor fibers of carbon fibers. The carbon fibers have more excellent strength and elastic modulus than those of other fibers, whereby the carbon fibers are widely used as reinforcing materials for composite materials not only in sports and aerospace applications, but also in general industrial applications such as automobiles, windmills, and pressure vessels. It is necessary to reduce producing cost to provide inexpensive carbon fibers to meet a wide variety of needs in various applications. Also, in the step of producing acrylic fibers, there have been disclosed a large number of techniques of improving production efficiency to provide cost reduction. For example, when a plurality of thread bundles are caused to travel in parallel, the thread bundles to be treated are thickened and the number of the thread bundles to be produced is increased, to enhance productivity, which can be said to be effective to reduce production costs.

A step of producing an acrylic fiber bundle generally includes steps of spinning a polymer solution into a coagulated thread bundle, cleaning the coagulated thread bundle in a bath to remove a spinning solvent, and stretching the coagulated thread bundle in the bath. An oil agent may be applied to a fiber after stretching. When the method of enhancing productivity described above is easily promoted, mixing between thread bundles and coalescence between single yarns occur in a step of treating in a bath (hereinafter, sometimes referred to as an "in-bath treatment step") so that fuzz, breaking, and insufficient cleaning occur. When the fiber bundles aligned in the width direction of a device are compared to each other, uneven cleaning occurs. These cause not only impaired processability in the production step of the acrylic fiber bundle performed after the in-bath treatment step and the subsequent production step of the carbon fiber bundle, but also a largely deteriorated quality of the obtained carbon fiber bundle.

Methods of passing a thread bundle through a washing bath filled with a cleaning solution to clean the thread bundle have been already widely used. Several studies have been made on improvement in the cleaning efficiency.

For example, Japanese Patent Laid-Open Publication No. 59-36716 proposes a method of causing water to counterflow in a direction opposite to the traveling direction of a thread bundle expanded to have a thread density of 5,000 denier/cm or less in a plurality of washing baths, to subject the thread bundle to multistage water cleaning.

Japanese Patent Laid-Open Publication No. 2008-88616 proposes a method of stepwise passing a thread bundle from cleaning water of 50° C. or more and 65° C. or less into cleaning water of 95° C. or more and 99° C. or less using a plurality of washing baths.

Furthermore, Japanese Patent Laid-Open Publication No. 2005-171447 proposes a method of using a roll having a member that supports a thick thread bundle of 2,200 to 5,500 dtex/mm on an outer peripheral portion when the thick thread bundle is subjected to an in-bath treatment.

A method of controlling the flow of a cleaning solution is proposed to solve a problem that the turbulent flow of the cleaning solution occurring from the accompanying flow of the cleaning solution to a traveling thread bundle causes mixing between the thread bundles adjacent to each other to occur. Japanese Patent Laid-Open Publication No. 2005-171447 discloses a method in which a shielding plate is provided in a washing bath, whereby the accompanying flow to the thread bundle is reflected by the shielding plate, and a solvent contained in the thread bundle is stepwise removed by the flow of the cleaning solution occurring in a region in front of the shielding plate. Japanese Patent Laid-Open Publication No. 08-246222 describes a method of arranging a flow straightener along the inner side of the side surface and bottom face of a washing bath to suppress the disturbance of the flow of a cleaning solution caused by an accompanying flow.

Furthermore, in recent years, in the production of an acrylic fiber bundle, to improve productivity, a thread bundle is made thicker or the number of the thread bundles is increased. Thus, the thread bundles traveling in parallel in a machine width direction are generated in a different situation from other thread bundle, which accordingly causes a problem that the quality of the obtained acrylic fiber bundle varies.

To address this problem, Japanese Patent Laid-Open Publication No. 2008-95256 discloses a method of cleaning a plurality of thread bundles while causing the thread bundles to travel in parallel using a washing bath including a nozzle header capable of subjecting a traveling fiber bundle to a uniform liquid treatment. High-speed cleaning water is sprayed from a lower stream side to an upper stream side in the traveling direction of the fiber bundle over the entire width of every thread bundle. It is described that the cleaning water is scattered among the thread bundles toward the upper stream side of the traveling of the thread bundles so that a solvent is efficiently removed, which eliminates the need for a multistage treatment for cleaning.

In recent years, the high density of the thread bundles has been increasingly required. A method of efficiently cleaning the solvent contained in the high-density thread bundles has been required. That is, the method disclosed in Japanese Patent Laid-Open Publication No. 59-36716 disadvantageously causes the insufficient cleaning of the high-density thread bundle so that densification is inhibited by the solvent remaining in the subsequent drying treatment step, which disadvantageously causes a deteriorated quality to be actualized.

In the method disclosed in Japanese Patent Laid-Open Publication No. 2008-88616, in fact, the mere temperature increase is apt to cause the single yarns to coalesce to each other. This coalescence causes the single yarn or the thread bundle to be broken in the subsequent stretching step, as a result of which processability is disadvantageously deteriorated.

The method disclosed in Japanese Patent Laid-Open Publication No. 2005-171447 can provide sufficient cleaning efficiency and an effect of suppressing coalescence between single yarns. However, by providing the member on the outer periphery portion of the roll, the thread bundle is vibrated to improve a water cleaning effect, which causes a concern that the thread bundle is damaged. The use of the plurality of washing baths causes a complicated device, which disadvantageously causes deteriorated productivity.

When the members are excessively installed in the washing bath as in Japanese Patent Laid-Open Publication No. 2005-171447 or Japanese Patent Laid-Open Publication No. 08-246222, single fiber waste is caught on the members and rubbed by the traveling thread, which disadvantageously causes a deteriorated quality of the obtained fiber bundle.

Furthermore, the method of Japanese Patent Laid-Open Publication No. 2008-95256 causes the force of the cleaning solution to damage the thread bundle when the cleaning solution passes at a high speed between the single yarns of the thread bundle in an acrylic fiber bundle for a carbon fiber bundle and the like, and the single fiber is cut in the subsequent latter step, which causes the fuzz to occur. This disadvantageously causes a deteriorated quality. The whole thread bundle is cut, which disadvantageously causes deteriorated processability.

Thus, there are technical problems in a step of producing an acrylic fiber bundle, in particular, an in-bath treatment step to produce a high-quality acrylic fiber bundle.

It could therefore be helpful to sufficiently clean an acrylic fiber bundle in a cleaning step in steps of producing the acrylic fiber bundle, prevent mixing from occurring between thread bundles adjacent to each other, and prevent fuzz of single fibers from occurring.

SUMMARY

We thus provide:

(1) A method of producing an acrylic fiber bundle in which an acrylic polymer solution is spun to make a coagulated thread bundle, and the coagulated thread bundle is then subjected to at least an in-bath treatment step and an oil agent application step, wherein:

the in-bath treatment step includes an in-bath cleaning step;

the in-bath cleaning step is a step in which the plurality of coagulated thread bundles travel in parallel and are cleaned in one or more washing baths including an inflow portion and an outflow portion for a cleaning solution;

at least one of the washing baths is a counterflow washing bath in which the cleaning solution flows into from the inflow portion located at a lower stream side position of a traveling direction of the coagulated thread bundles, and flows out from the outflow portion located at an upper stream side position of the traveling direction of the coagulated thread bundles; and an average of coefficients of variation CV of linear speeds of the cleaning solution in the inflow portion of the counterflow washing bath is 0.30 or less, and an average of coefficients of variation CV of linear speeds of the cleaning solution in the outflow portion of the counterflow washing bath is 0.30 or less.

(2) The method of producing an acrylic fiber bundle, wherein the inflow of the cleaning solution is performed by at least one of the following means a) to c):

a) inflow due to overflow using an overflow weir in which a difference in height between both end portions with respect to a central portion of the weir is 0.0 to ±7.0 mm;

b) inflow from a nozzle having 0.5 N or more holes (N is an integer of 3 or more, which is the number of coagulated thread bundles caused to be travelled in parallel); and c) inflow from a plate having a plurality of holes, wherein a ratio of the sum of areas of the plurality of holes to an area of the plate (opening ratio) is 10 to 60%.

(3) The method of producing an acrylic fiber bundle according to any one of the above, wherein the outflow of the cleaning solution is performed by at least one of the following means d) and e):

d) outflow due to overflow using an overflow weir in which a difference in height between both end portions with respect to a central portion of the weir is 0.0 to ±7.0 mm; and e) outflow from a plate having a plurality of holes, wherein a ratio of the sum of areas of the plurality of holes to an area of the plate (opening ratio) is 10 to 60%.

(4) The method of producing an acrylic fiber bundle according to any one of the above, wherein a plurality of counterflow washing baths are arranged in series along a plurality of coagulated thread bundles traveling in parallel.

(5) The method of producing an acrylic fiber bundle according to any one of the above, wherein three or more coagulated thread bundles having a thread bundle density index M of 500 to 5,000 dtex/mm defined by the following formula are caused to travel in parallel, and subjected to an in-bath treatment in a state where a thread bundle width density index L of the coagulated thread bundle defined by the following formula is 5 to 100%:

$$M[\text{dtex/mm}]=(\text{fineness per coagulated thread bundle [dtex]})/(\text{coagulated thread bundle width [mm]})$$

$$L[\%]=(\text{distance between coagulated thread bundles [mm]})\times 100/(\text{coagulated thread bundle width [mm]}).$$

(6) A method of producing a carbon fiber bundle, the method including the steps of:

producing an acrylic fiber bundle by the method of producing an acrylic fiber bundle according to any one of the above;

subjecting the acrylic fiber bundle to an oxidation treatment in an oxidative atmosphere; and subjecting the acrylic fiber bundle to a carbonization treatment in an inert atmosphere.

The method of producing an acrylic fiber bundle prevents mixing from occurring between thread bundles adjacent to each other, and prevents fuzz of single fibers from occurring, in an in-bath treatment step after an acrylic polymer solution is spun to make a coagulated thread bundle. As a result, a high-quality acrylic fiber is obtained.

BRIEF DESCRIPTION OF THE DRAWINGS

FIGS. 1A and 1B are schematic views showing a method of measuring CV of a linear speed of a cleaning solution in an inflow portion when the cleaning solution is caused to flow into by an overflow weir. FIG. 1A is a plan view, and FIG. 1B is a side view.

FIGS. 2A and 2B are schematic views showing a method of measuring the CV of the linear speed of a cleaning solution in an inflow portion when the cleaning solution is caused to flow into by a nozzle. FIG. 2A is a plan view, and FIG. 2B is a side view.

FIGS. 3A and 3B are schematic views showing a method of measuring the CV of the linear speed of a cleaning solution in an outflow portion when the cleaning solution is caused to flow out by an overflow weir. FIG. 3A is a plan view, and FIG. 3B is a side view.

FIGS. 4A and 4B are schematic views of a method of causing a cleaning solution to flow into and flow out using an overflow weir as an example. FIG. 4A is a plan view, and FIG. 4B is a side view.

FIGS. 5A and 5B are schematic views of a method of causing a cleaning solution to flow into using a nozzle and causing the cleaning solution to flow out using an overflow weir as an example. FIG. 5A is a plan view, and FIG. 5B is a side view.

DESCRIPTION OF REFERENCE SIGNS

1: Counterflow washing bath
1*d*: Lowermost stream counterflow washing bath
1*t*: Uppermost stream counterflow washing bath
2: Cleaning solution
3: Thread bundle
4: Roll
5: Overflow weir
5*d*: Lowermost stream overflow weir
5*t*: Uppermost stream overflow weir
6: Nozzle
7: Pump
X: Thread bundle traveling direction
Y: Flow direction of cleaning solution

DETAILED DESCRIPTION

It is important that a solvent contained in thread bundles is uniformly removed among the thread bundles before a drying treatment step to stably produce a plurality of acrylic fiber bundles in parallel. We found that the solvent contained in the thread bundles traveling in parallel can be efficiently cleaned and removed while a high quality is maintained.

Unless otherwise indicated, "lower stream" herein is a traveling direction of a fiber bundle, and "upper stream" is a direction opposite to the lower stream. A plate having a plurality of holes may be referred to as a "perforated plate."

First, a method of producing an acrylic fiber bundle will be described. The acrylic fiber bundle is mainly composed of a polymer containing acrylonitrile. Specifically, the polymer is a polymer containing 85% by mass or more of acrylonitrile, and may be copolymerized with 15% by mass or less of other comonomer. The content of acrylonitrile is particularly preferably 95% by mass or more. Examples of the comonomer include acrylic acid, methacrylic acid, itaconic acid, and alkyl esters such as methyl ester, ethyl ester, propyl ester, and butyl ester thereof; and alkali metal salts, ammonium salts, allyl sulfonic acid, methallyl sulfonic acid, styrene sulfonic acid, and alkali metal salts thereof. However, the comonomer is not particularly limited thereto. When the content of the comonomer exceeds 15% by mass, the physical properties of the finally obtained carbon fiber bundle are deteriorated, which is not preferable. An acrylic polymer is polymerized by using ordinary polymerization methods such as emulsion polymerization, suspension polymerization, and solution polymerization. A polymer solution containing the acrylic polymer, and dimethylacetamide, dimethylsulfoxide, dimethylformamide, nitric acid, zinc chloride, or an aqueous sodium rhodanide solution and the like is used as a spinning dope solution, and spun by an ordinary wet spinning method and dry-jet wet spinning method, followed by performing an in-bath treatment step, an oil agent application step, and other steps, whereby an acrylic fiber bundle can be obtained.

In the production method, any coagulated thread bundle can be preferably applied as long as it is a coagulated thread bundle spun from the acrylic polymer as described above. A multifilament yarn in which the number of single fibers is 3,000 to 70,000, preferably 6,000 to 50,000, and more preferably 12,000 to 25,000 has a more remarkable effect.

In particular, when three or more thread bundles are treated, the cleaning efficiency is large. When five or more thread bundles are treated, the cleaning efficiency is larger, which is preferable.

The acrylic polymer solution is spun to make a coagulated thread bundle, and a plurality of threads are then combined if necessary to form a coagulated thread bundle (hereinafter, referred to as a "thread bundle"), followed by cleaning the coagulated thread bundle in a bath. Therefore, a plurality of thread bundles are caused to travel in parallel in one or more washing baths including an inflow portion and an outflow portion for a cleaning solution. The cleaning solution having a mass of preferably 5 times or more, more preferably 5 to 20 times, and still more preferably 7 to 15 times or less, of that of the acrylic polymer in the thread bundle traveling in the washing bath per unit time is caused to flow in from the inflow portion located on the lower stream side of the counterflow washing bath, and to flow out from the outflow portion located on the upper stream side. The cleaning solution having a mass of 5 times or more provides sufficient removal of the solvent contained in the thread bundle. The cleaning solution preferably has a mass of 20 times or less from the viewpoint of the cost for a solvent recovery equipment and the like.

The magnification ratio of the mass of the cleaning solution is a ratio of the mass [g/min] per unit time of the cleaning solution caused to flow in from the inflow portion to the mass [g/min] of the acrylic polymer in the coagulated thread bundle traveling in the counterflow washing bath per unit time. This ratio may be referred to as a "cleaning solution mass ratio". The mass of the acrylic polymer in the thread bundle means the mass itself of the acrylic polymer not including the mass of the solvent and the like contained in the thread bundle.

Furthermore, the cleaning solution flows into the counterflow washing bath from a lower stream portion in the traveling direction of the thread bundle, and the cleaning solution flows out from the upper stream portion of the thread. When a plurality of counterflow washing baths are used, it is preferable that the cleaning solution flowing out from each counterflow washing bath flows into one upper stream counterflow washing bath. The cleaning solution flowing out from the uppermost stream counterflow washing bath can be treated in a recovery step. A part of the cleaning solution can be supplied to a coagulation bath, and the remainder can be treated in the recovery step.

In the cleaning step in the bath, it is necessary to set an average of coefficients of variation CV of linear speeds of the cleaning solution in the inflow portion of the counterflow washing bath to 0.30 or less, and set an average of coefficients of variation CV of linear speeds of the cleaning solution in the outflow portion of the counterflow washing bath to 0.30 or less. The average of coefficients of variation CV is obtained by arithmetically averaging coefficients of variation CV observed in each of a plurality of counterflow washing baths.

The average of coefficients of variation CV of the cleaning solution in the inflow portion of the counterflow washing bath is preferably less than 0.25, and the overall average of coefficients of variation CV of linear speeds of the cleaning solution in the outflow portion of the counterflow washing bath is more preferably less than 0.25. Uneven cleaning when the coagulated thread bundles traveling in parallel in a machine width direction are compared to each other can be suppressed low.

The coefficient of variation CV of the linear speed of the cleaning solution can be determined as follows.

Coefficient of Variation CV [-] in Linear speed of Cleaning Solution in Inflow Portion FIGS. 1A, 1B, 2A and 2B illustrate a method of measuring the linear speed of a cleaning solution in an inflow portion. A foam polystyrene spherical body having a diameter of 3 mm is floated in a cleaning solution, and a time for which the central portion of the foam polystyrene spherical body moves by 30 mm in a direction opposite and parallel to the traveling direction of a coagulated thread bundle on the liquid level of the cleaning solution caused to flow into is measured to calculate a linear speed in an inflow portion. However, when the cleaning solution flows into from a nozzle as shown in FIGS. 2A and 2B, a time for which the foam polystyrene spherical body further moves by 30 mm from a point separated by 30 mm in the traveling direction of the cleaning solution from the nozzle is measured. A range from an end coagulated thread bundle traveling in parallel to the other end coagulated thread bundle, that is, equally-spaced nine points are measured including points A and B in a line segment A-B shown in FIGS. 1A and 2A, to determine the linear speed of the cleaning solution. The ratio of the arithmetic average to the standard deviation is taken as the CV of the linear speed of the cleaning solution in the inflow portion. This measurement is performed under conditions in which an acrylic fiber bundle is produced. Here, the standard deviation is obtained according to numerical formula (1).

$$[\text{Standard deviation}]^2 = \frac{1}{8}\sum_{i=1}^{9}(x_i - \mu_1)^2 \quad (1)$$

$x_i$ (i is a value of 1 to 9) represents a linear speed, and $\mu_1$ is an arithmetic average of $x_1$ to $x_9$.

Coefficient of Variation CV [-] of Linear Speed of Cleaning Solution in Outflow Portion FIGS. 3A and 3B illustrate a method of measuring the CV of the linear speed of a cleaning solution in an outflow portion. A foam polystyrene spherical body having a diameter of 3 mm is floated in a cleaning solution, and a time for which the central portion of the foam polystyrene moves by 30 mm in a direction parallel to the traveling direction of the coagulated thread bundle on the liquid level before the cleaning solution is caused to flow out is measured to calculate a linear speed in the outflow portion. A range from an end coagulated thread bundle traveling in parallel to the other end coagulated thread bundle, that is, equally-spaced nine points are measured including points A and B in a line segment A-B in FIG. 3A. The ratio of the arithmetic average to the standard deviation is calculated as CV, and taken as CV of the linear speed of the cleaning solution in the outflow portion. This measurement is performed under conditions in which an acrylic fiber bundle is produced. Here, the standard deviation is defined as numerical formula (1).

In the counterflow washing bath used for in-bath cleaning, a plurality of coagulated thread bundles are supplied to below the liquid level of the washing bath from the upper stream side inlet of the counterflow washing bath by a rotating feed roller or a guide and the like, and are carried out from a lower stream side outlet to the outside of the washing bath by the same means. This form is referred to as a tray type washing bath. The coagulated thread bundle taken out is supplied to the next washing bath. The coagulated thread bundle taken out from the washing bath located at the lowermost stream position is supplied to an oiling device and the like. During cleaning, the cleaning solution is preferably heated. In at least some washing baths, the coagulated thread bundle is preferably stretched simultaneously with cleaning.

It is necessary to use one or more counterflow washing baths including an inflow portion and an outflow portion for the cleaning solution. It is preferable that a plurality of counterflow washing baths to be used be arranged in series in the direction of a plurality of coagulated thread bundles traveling in parallel. The number of the counterflow washing baths is preferably 5 to 40, more preferably 5 to 30, and still more preferably 10 to 25. When the number of the counterflow washing baths is 5 or more, the solvent contained in the coagulated thread bundle is sufficiently removed, and when the number of the counterflow washing baths is 10 or more, a concentration gradient can be formed in the cleaning solution, which can provide improved efficiency of cleaning. The number of the counterflow washing baths is preferably 40 or less from the viewpoint of the cost of equipment and the like. As described above, it is necessary to set the average of coefficients of variation CV of linear speeds of the cleaning solution in the inflow portion of one counterflow washing bath in all the washing baths to 0.30 or less, and set the average of coefficients of variation CV of linear speeds of the cleaning solution in the outflow portion of one washing bath in all the washing baths to 0.30 or less. Most preferably, all the counterflow washing baths satisfy the following CV ranges: the CV of the linear speed of the cleaning solution in the inflow portion is 0.30 or less, and the CV of the linear speed of the cleaning solution in the outflow portion is 0.30 or less.

In all the counterflow washing baths, the average of coefficients of variation CV of linear speeds of the cleaning solution in the inflow portion of one counterflow washing bath is preferably 0.30 or less by at least one of the following means a) to c):

a) inflow due to overflow using an overflow weir in which a difference in height between both end portions with respect to a central portion of the weir is 0.0 to ±7.0 mm; more preferably, a height from the central portion of the weir to each end portion smoothly changes. Smoothly changing means that no minimum point or maximum point is present between the central portion and each end portion;

b) inflow due to a nozzle having 0.5 N or more holes (N is an integer of 3 or more, which is the number of coagulated thread bundles caused to be travelled in parallel); and c) inflow from a perforated plate, wherein a ratio of the sum of areas of a plurality of holes to an area of the plate (opening ratio) is 10 to 60%.

The combinations and the variations may also be made. Examples thereof include the following inflow and outflow of the cleaning solution:

i) The cleaning solution is caused to flow into the lowermost stream counterflow washing bath using the overflow weir from the lower stream side;

ii) Then, the cleaning solution is caused to flow into a counterflow washing bath located immediately on the upper stream side of the counterflow washing bath through a perforated plate located on the lower stream side of the counterflow washing bath and having an opening ratio of 10 to 60%; and iii) Furthermore, the cleaning solution is caused to flow into a counterflow washing bath located on immediately the upper stream side of the counterflow washing bath from a nozzle located on the lower stream side of the counterflow washing bath via a pump and the like.

The materials of the weir, nozzle, and perforated plate are not limited, and materials not corroded by the cleaning solution and not deformed by heat such as stainless steel are preferable. The difference in height between both end portions with respect to a central portion of the weir is preferably 0.0 to ±7.0 mm because the variation in the flow velocity of the cleaning solution is suppressed. The difference in height is more preferably +1.0 to −5.0 mm, and still more preferably 0.0 to −3.0 mm. It is preferable that the line of the upper end portion of the weir smoothly change from the central portion to each end portion. This is because, when the line of the upper end portion has a corner, turbulent flow is apt to occur in the flow of the cleaning solution, and the CV of the linear speed of the cleaning solution is apt to be large. The height of the central portion or end portion of the weir is the height of the upper end of a portion from a horizontal surface to be assumed. A positive difference in height means that the height of the end portion is higher than that of the central portion.

When the nozzle is used, the shape of the hole is not limited. A nozzle is preferably used, which has preferably 0.5 N or more holes, more preferably 0.7 to 3.0 N, and still more preferably 0.8 to 1.2 N, which has an effect of suppressing unevenness in the linear speed of the cleaning solution. As described above, N is an integer of 3 or more, and is the number of the coagulated thread bundles caused to travel in parallel. With regard to the arrangement of the holes, preferably, when a hole density in each end portion is higher than that in the central portion, unevenness of the linear speed of the cleaning solution is effectively suppressed. At this time, it is preferable that the cleaning solution not be directly blown out in a direction perpendicular to the traveling coagulated thread bundle, but is blown out in parallel with the traveling coagulated thread bundle. The nozzle having less than 0.5 N holes causes unevenness to occur in the linear speed of the cleaning solution flowing into, which may cause the uneven cleaning of the coagulated thread bundle.

A porous plate, a net and the like can be used for the perforated plate. The shape of the plate and the shape of the hole are not limited. The opening ratio of the porous plate below the liquid level is preferably 10 to 60%. More preferably, the opening ratio of each end portion of the plate is 30 to 50%, and the opening ratio of the central portion is 10 to 40% or less. More preferably, the opening ratio of each end portion of the plate is 40 to 50%, and the opening ratio of the central portion is 20 to 30% or less. This provides a narrow distribution of the linear speed.

When the perforated plate is a net, a metal net can be used. The net size is preferably 24 mesh or more, more preferably 60 mesh or more, and still more preferably 100 mesh or more. This provides a narrow distribution of the linear speed of the cleaning solution. The cleaning solution to be used may be any liquid as long as the cleaning solution cleans and removes the solvent contained in the acrylic fiber bundle. Water is preferably used from the viewpoints of the recovery of the solvent and the cost of the cleaning solution.

Means flowing out the cleaning solution to set the average of coefficients of variation CV of linear speeds of the cleaning solution in the outflow portion of the counterflow washing bath to 0.30 or less is preferably at least one means of the following d) and e):

d) outflow due to overflow using an overflow weir in which a difference in height between both end portions with respect to a central portion of the weir is 0.0 to ±7.0 mm; and more preferably, a height from the central portion of the weir to each end portion smoothly changes. "Smoothly changing" indicates that no minimum point or maximum point is present between the central portion and each end portion; and e) outflow from a plate having a plurality of holes, wherein a ratio of the sum of areas of the plurality of holes to an area of the plate (opening ratio) is 10 to 60%.

For example, outflow methods can be combined: the cleaning solution is caused to flow out from the lower stream washing bath with respect to the traveling direction of the coagulated thread bundle using the overflow weir, and the cleaning solution is then caused to flow out to an upper stream washing bath located on an upper stream side by one with respect to the traveling direction of the coagulated thread bundle using a plate having an opening ratio of 10 to 60%.

When the overflow weir is used, the overflow weir may be similar to that described in the section "inflow portion" herein. The state of the height of the weir shown above provides a uniform linear speed of the cleaning solution.

The perforated plate is preferably similar to that described in the section "inflow portion" herein. The perforated plate having the opening ratio and the mesh size provides a narrow distribution of the linear speed of the cleaning solution.

Even if the appearance of the washing bath looks like one, the number of the washing baths is counted as two when the tub is divided into two in the thread traveling direction by the overflow weir and the perforated plate. When the washing bath is divided into three, the number is counted as three. The number of the washing baths increases likewise as the number of divided intervals increases. The traveling coagulated thread bundle needs to be below the liquid level of the cleaning solution, but between the washing baths, the coagulated thread bundle can be caused to travel above the liquid level by using a feeding roller and a guide and the like.

The coagulated thread bundle preferably has a thread bundle density index M of 500 to 5,000 dtex/mm, and more preferably 1,000 to 3,000 dtex/mm. The thread bundle density index M is defined by the following formula. By setting the thread bundle density index M to 500 dtex/mm or more, the whole equipment can be made compact, and by setting the thread bundle density index M to 5,000 dtex/mm or less, the efficiency of cleaning can be raised.

$M[\text{dtex/mm}]=$(fineness per coagulated thread bundle [dtex])/(coagulated thread bundle width [mm]).

When all the coagulated thread bundles preferably have a thread bundle width density index L of 5 to 100%, more preferably 5 to 90%, and still more preferably 10 to 80%, the resulting effects are remarkable. The thread bundle width density index L is defined by the following formula. When the thread bundle width density index L is 5% or more, mixing between the coagulated thread bundles is suppressed, and the thread bundle width density index L is preferably 100% or less from the viewpoint of the cost of equipment and the like.

$L[\%]=$(distance between coagulated thread bundles [mm])×100/(coagulated thread bundle width [mm]).

When the thread bundle is subjected to a drying treatment step, the thread bundle is more preferably cleaned until a solvent remaining amount derived from spinning in the thread bundle becomes 1,000 mass ppm or less, and further 400 mass ppm or less. Sufficient cleaning can prevent occurrence of voids in the thread or coalescence between single fibers in the subsequent drying treatment step. By increasing the cleaning solution mass ratio or the number of the washing baths and the like, cleaning can be sufficiently performed, which can provide a decreased solvent remaining amount in the thread bundle.

Thus, the solvent remaining amount in the thread bundle affects the occurrence of voids in the drying treatment step or the coalescence between single fibers, whereby uneven cleaning between the thread bundles is preferably reduced when formation of a thick thread bundle, high-density thread bundle, or multiple thread bundle is promoted. An index representing uneven cleaning between thread bundles is variation of the solvent remaining amount. The coefficient of variation CV of the solvent remaining amount is preferably 0.25 or less, and more preferably less than 0.15.

In the method of producing an acrylic fiber bundle, the thread bundle may be showered with the cleaning solution before or after the in-bath treatment step, or a pressurized gas may be sprayed to the thread bundle. The thread bundle, the roller, and the cleaning solution may be subjected to an ultrasonic treatment.

In the in-bath treatment step, stretching is preferably performed simultaneously with cleaning by providing a speed difference between roller rotation on an inlet side and roller rotation on an outlet side at least in some of the washing baths. The stretching can be performed in a state where the stretching ratios of a plurality of washing baths for stretching are respectively set for the washing baths to obtain an intended stretching ratio. The thread can also be treated while the thread is stretched in a part of the first or second half of baths without being stretched in the other baths, and tension is applied to the thread to such an extent that the thread becomes tense. The thread bundle is usually stretched about 2 to 6 times in a liquid at 50 to 98° C., and an oil agent is further applied to the thread bundle. Thereafter, a drying treatment by a hot roller and the like, and secondary stretching by steam application and the like can be performed. When the acrylic fiber of the acrylic fiber bundle thus obtained is used particularly as a precursor of a carbon fiber, the processability of production of a carbon fiber bundle and the quality of the obtained carbon fiber bundle become good.

Next, a method of producing the carbon fiber bundle from the acrylic fiber bundle obtained by the production method will be described.

The acrylic fiber bundle obtained by the above-mentioned production method is subjected to an oxidation treatment in an oxidative atmosphere at 200 to 300° C. It is preferable to raise the treatment temperature from low temperatures to high temperatures in a plurality of steps to obtain the oxidized fiber bundle. Furthermore, it is preferable to stretch the fiber bundle at a high stretching ratio to not cause the occurrence of fuzz to sufficiently express the performance of the carbon fiber bundle. Then, the carbon fiber bundle is produced by heating the obtained oxidized fiber bundle to 1,000° C. or more in an inert atmosphere such as nitrogen.

Thereafter, anodic oxidation is performed in an aqueous electrolyte solution, which makes it possible to impart a functional group to the surface of the carbon fiber, thereby improving adhesion of the carbon fiber to the resin. For example, if a sizing agent made of an epoxy resin and the like is applied to the carbon fiber bundle, the obtained carbon fiber bundle has excellent abrasion resistance. The obtained carbon fiber bundle can be widely used as reinforcing materials for composite materials not only in sports and aerospace applications but also in general industrial applications such as automobiles, windmills, and pressure vessels.

EXAMPLES

Hereinafter, our methods will be more specifically described in the Examples.

Flow of Cleaning Solution

Water was used as a cleaning solution. In each of Examples and Comparative Examples, a new cleaning solution is caused to flow into a lowermost stream counterflow washing bath in the traveling direction of a coagulated thread bundle. The cleaning solution is caused to flow into the lower stream side of each counterflow washing bath. The cleaning solution is caused to flow out from the upper stream side of the counterflow washing bath. The cleaning solution flowing out from the counterflow washing bath is caused to flow into a counterflow washing bath located on immediately the upper stream side of the counterflow washing bath.

CV [-] of Linear Speed of Cleaning Solution in Inflow Portion

FIGS. 1A, 1B, 2A and 2B illustrate a method of measuring CV of a linear speed of a cleaning solution in an inflow portion of a counterflow washing bath. A foam polystyrene spherical body having a diameter of 3 mm was floated in a cleaning solution, and a time for which the central portion of the foam polystyrene moved by 30 mm in a direction parallel to a coagulated thread bundle on the surface of the cleaning solution caused to flow into was measured to calculate a linear speed in an inflow portion. However, when the cleaning solution was caused to flow into from a nozzle as shown in FIGS. 2A and 2B, a time for which the cleaning solution further moved by 30 mm from a starting point separated by 30 mm in the traveling direction of the cleaning solution from the nozzle, that is, the upper stream direction was measured. A range from a farthest end coagulated thread bundle to an opposite farthest end coagulated thread bundle of the coagulated thread bundles traveling in parallel, that is, equally-spaced nine points were measured including points A and B in a line segment A-B in FIGS. 1A and 2A. A ratio of the arithmetic average and standard deviation was determined, which was taken as the CV of the linear speed of the cleaning solution in the inflow portion.

This measurement was performed under conditions in which an acrylic fiber bundle was produced. The standard deviation was obtained according to numerical formula (1).

$$[\text{Standard deviation}]^2 = \frac{1}{8} \Sigma_{i=1}^{9} (x_i - \mu_1)^2 \tag{1}$$

xi (i is a value of 1 to 9) represents a linear speed, and $\mu_1$ is an arithmetic average of $x_1$ to $x_9$.

CV [-] of Linear Speed of Cleaning Solution in Outflow Portion

FIGS. 3A and 3B illustrate a method of measuring CV of a linear speed of a cleaning solution in an outflow portion. A foam polystyrene spherical body having a diameter of 3 mm was floated in a cleaning solution, and a time for which the central portion of the foam polystyrene moved by 30 mm in a direction opposite and parallel to the traveling direction of the coagulated thread bundle on the surface of the cleaning solution caused to flow out was measured to calculate a linear speed in the outflow portion. A range from a farthest end coagulated thread bundle to an opposite farthest end coagulated thread bundle of the coagulated thread bundles traveling in parallel, that is, equally-spaced nine points were measured including points A and B in a line segment A-B in FIG. 3A. A ratio of the arithmetic average and standard deviation was determined, which was taken as CV of the linear speed of the cleaning solution in the outflow portion. This measurement was performed under conditions in which an acrylic fiber bundle was produced. The standard deviation was obtained according to numerical formula (1).

Measurement of Mass

The mass was measured under conditions of 20±2° C. and a relative humidity of 65%±4% based on JIS L 0105 (2006).

Solvent in Thread Bundle

The thread bundle after passing through an in-bath treatment step was collected. It was boiled in distilled water at 100° C. for 1.5 hours. The thread bundle was dewatered by a centrifugal separator, and then dried in a dryer at 100° C. for 2.0 hours. The mass was then weighed to obtain a sample dry weight (g). The moisture of a mixed solution of the boiled solution and the solution squeezed by the centrifugal separator was evaporated by using a water bath at 100° C. to concentrate the mixed solution. The concentrated solution was analyzed by gas chromatography, and the mass (g) of dimethyl sulfoxide (hereinafter, referred to as "DMSO") was determined by using a previously prepared calibration curve. The mass was taken as the amount of a solvent remaining in the thread bundle. Methyl acetoacetate was used as an internal standard. A solvent remaining amount [DMSO remaining amount in thread bundle] was calculated according to the calculating formula: DMSO remaining amount in thread bundle (ppm)=DMSO in thread bundle mass (g)× 1000000/sample dry mass (g).

CV of Solvent Remaining Amount

The solvent remaining amounts of all coagulated thread bundles traveling in parallel were measured, and a ratio of the arithmetic average and standard deviation was determined, which was taken as CV of the solvent remaining amount. The standard deviation was obtained according to numerical formula (2).

$$[\text{Standard deviation}]^2 = \frac{1}{N-1}\sum_{n=1}^{N}(y_n - \mu_2)^2 \quad (2)$$

$y_n$ (n is a value of 1 to N) represents a solvent remaining amount, and $\mu_2$ is an arithmetic average of $y_1$ to $y_N$. N is the number of the coagulated thread bundles.

Cleaning Solution Mass Ratio [-]

The cleaning solution mass ratio is a ratio of the mass [g/min] per unit time of the cleaning solution caused to flow into from the inflow portion to the mass [g/min] of an acrylic polymer in the coagulated thread bundle traveling in the counterflow washing bath per unit time. The mass of the acrylic polymer in the coagulated thread bundle was taken as a mass of a residue obtained by sampling the polymer extruded for a predetermined time, and extracting a solvent and the like with warm water, followed by drying in a drier at 100° C. for 2.0 hours. Meanwhile, the mass of the cleaning solution caused to flow into for the same time in the washing bath located at the lowermost stream position was measured. The cleaning solution mass ratio was determined by the ratio of the masses.

Mixing Occurrence Frequency [Times/Between Thread Bundles/100 m]

On the lower stream roller side with respect to the traveling thread bundle of the washing bath, frequencies at which the fibers cross each other in a traveling distance of 100 m between the thread bundles traveling in parallel were counted.

Amount of Occurrence of Fuzzes [Piece/Thread Bundle/1000 m]

After steam stretching, the traveling thread bundle was visually observed, to count the number of occurrence of fuzzes per 1000 m of one thread bundle.

Example 1

A DMSO solution consisting of 99.5 mol % of acrylonitrile and 0.5 mol % of itaconic acid and containing 20% by mass of an acrylic copolymer as a spinning dope solution was spun from a spinneret into a coagulation bath consisting of DMSO and water, to obtain a coagulated thread bundle.

As shown in FIGS. 4A and 4B, the coagulated thread bundle was caused to travel in a plurality of counterflow washing baths arranged in series to subject the coagulated thread bundle to in-bath cleaning. A double wavy line means that the illustration of the plurality of counterflow washing baths is omitted.

40 coagulated thread bundles having 12,000 single fibers were arranged in parallel. A thread bundle density M was set to 2,400 dtex/mm A thread bundle width density index L was set to 15%. A cleaning solution mass ratio was set to 10. The number of the counterflow washing baths is 10 in this Example.

Into a lowermost stream counterflow washing bath 1d, a cleaning solution was caused to flow over an overflow weir 5d in which a difference in height between both end portions with respect to a central portion of the weir was −3.0 mm, and a height from the upper end portion of the central portion to the upper end portion of each end portion smoothly changed. From the counterflow washing bath, the cleaning solution was caused to flow out over an overflow weir having the same form as that previously described. The cleaning solution was caused to flow into and flow out using a counterflow washing bath including an inflow overflow weir and an outflow overflow weir having the same form. The inflow and the outflow were performed in all the counterflow washing baths. The CV of the linear speed of each of the inflow portion and outflow portion of the cleaning solution was measured in each counterflow washing bath. The solvent remaining amount of the thread bundle after an in-bath treatment step was measured to calculate the CV of the solvent remaining amount.

Furthermore, the thread bundle after cleaning was stretched in the bath, and an oil agent was further applied in the bath. As the oil agent, an oil agent containing amino-modified silicone was used. Next, by using a heating roller at 160° C., the thread bundle was dried until a moisture amount contained in the thread bundle was set to 1% by mass or less, and then stretched in pressurized steam, to obtain an acrylic fiber bundle having 12,000 filaments. The amount of occurrence of fuzz of the thread bundle after steam stretching was measured. The results are shown in Tables 1 and 2. Then, the obtained acrylic fiber bundle was subjected to an oxidation treatment while the acrylic fiber bundle was conveyed in an oxidation furnace at 240 to 280° C. in air by a driving roll, to be converted into an oxidized fiber bundle. Furthermore, the oxidized fiber bundle was conveyed in a precarbonization furnace at 300 to 800° C. in an inert atmosphere by a driving roll to be pre-carbonized, and the pre-carbonized oxidized fiber bundle was then carbonized while being conveyed in a carbonization furnace at 1,500° C. in an inert atmosphere by a driving roll, to obtain a carbon fiber bundle.

The invention claimed is:

1. A method of producing an acrylic fiber bundle in which an acrylic polymer solution is spun to make a coagulated thread bundle, and
the coagulated thread bundle is then subjected to at least an in-bath treatment step and an oil agent application step,
wherein:
the in-bath treatment step includes an in-bath cleaning step;
the in-bath cleaning step is a step in which the plurality of coagulated thread bundles travel in parallel and are cleaned in one or more washing baths including an inflow portion and an outflow portion for a cleaning solution;
at least one of the washing baths is a counterflow washing bath in which the cleaning solution flows into from the inflow portion located at a lower stream side position of a traveling direction of the coagulated thread bundles, and flows out from the outflow portion located at an upper stream side position of the traveling direction of the coagulated thread bundles; and
an average of coefficients of variation CV of linear speeds of the cleaning solution in the inflow portion of the counterflow washing bath is 0.30 or less, and
an average of coefficients of variation CV of linear speeds of the cleaning solution in the outflow portion of the counterflow washing bath is 0.30 or less,
wherein the inflow of the cleaning solution is performed by at least one of a) to c):
a) inflow due to overflow using an overflow weir in which a difference in height between both end portions with respect to a central portion of the weir is 0.0 to ±7.0 mm;
b) inflow from a nozzle having 0.5 N or more holes (N is an integer of 3 or more, which is the number of coagulated thread bundles caused to be travelled in parallel); and
c) inflow from a plate having a plurality of holes, wherein, a ratio of the sum of areas of the plurality of holes to an area of the plate (opening ratio) is 10 to 60%.

2. A method of producing an acrylic fiber bundle in which an acrylic polymer solution is spun to make a coagulated thread bundle, and
the coagulated thread bundle is then subjected to at least an in-bath treatment step and an oil agent application step,
wherein:
the in-bath treatment step includes an in-bath cleaning step;
the in-bath cleaning step is a step in which the plurality of coagulated thread bundles travel in parallel and are cleaned in one or more washing baths including an inflow portion and an outflow portion for a cleaning solution;
at least one of the washing baths is a counterflow washing bath in which the cleaning solution flows into from the inflow portion located at a lower stream side position of a traveling direction of the coagulated thread bundles, and flows out from the outflow portion located at an upper stream side position of the traveling direction of the coagulated thread bundles; and
an average of coefficients of variation CV of linear speeds of the cleaning solution in the inflow portion of the counterflow washing bath is 0.30 or less, and
an average of coefficients of variation CV of linear speeds of the cleaning solution in the outflow portion of the counterflow washing bath is 0.30 or less, wherein the outflow of the cleaning solution is performed by at least one of d) and e):
d) outflow due to overflow using an overflow weir in which a difference in height between both end portions with respect to a central portion of the weir is 0.0 to ±7.0 mm; and
e) outflow from a plate having a plurality of holes, wherein a ratio of the sum of areas of the plurality of holes to an area of the plate (opening ratio) is 10 to 60%.

3. The method according to claim 1, wherein the outflow of the cleaning solution is performed by at least one of d) and e):
d) outflow due to overflow using an overflow weir in which a difference in height between both end portions with respect to a central portion of the weir is 0.0 to ±7.0 mm; and
e) outflow from a plate having a plurality of holes, wherein a ratio of the sum of areas of the plurality of holes to an area of the plate (opening ratio) is 10 to 60%.

4. The method according to claim 1, wherein a plurality of counterflow washing baths are arranged in series along a plurality of coagulated thread bundles traveling in parallel.

5. The method according to claim 1, wherein three or more coagulated thread bundles having a thread bundle density index M of 500 to 5,000 dtex/mm defined below are caused to travel in parallel, and subjected to an in-bath treatment in a state where a thread bundle width density index L of the coagulated thread bundle defined below is 5 to 100%:

$$M[\text{dtex/mm}]=(\text{fineness per coagulated thread bundle [dtex]})/(\text{coagulated thread bundle width [mm]})$$

$$L[\%]=(\text{distance between coagulated thread bundles [mm]})\times 100/(\text{coagulated thread bundle width [mm]}).$$

6. A method of producing a carbon fiber bundle, the method comprising:
producing an acrylic fiber bundle by the method according to claim 1;
subjecting the acrylic fiber bundle to an oxidation treatment in an oxidative atmosphere; and
subjecting the acrylic fiber bundle to a carbonization treatment in an inert atmosphere.

7. The method according to claim 2, wherein three or more coagulated thread bundles having a thread bundle density index M of 500 to 5,000 dtex/mm defined below are caused to travel in parallel, and subjected to an in-bath treatment in a state where a thread bundle width density index L of the coagulated thread bundle defined below is 5 to 100%:

$$M[\text{dtex/mm}]=(\text{fineness per coagulated thread bundle [dtex]})/(\text{coagulated thread bundle width [mm]})$$

$$L[\%]=(\text{distance between coagulated thread bundles [mm]})\times 100/(\text{coagulated thread bundle width [mm]}).$$

8. The method according to claim 3, wherein three or more coagulated thread bundles having a thread bundle density index M of 500 to 5,000 dtex/mm defined below are caused to travel in parallel, and subjected to an in-bath treatment in a state where a thread bundle width density index L of the coagulated thread bundle defined below is 5 to 100%:

$M$[dtex/mm]=(fineness per coagulated thread bundle [dtex])/(coagulated thread bundle width [mm])

$L$[%]=(distance between coagulated thread bundles [mm])×100/(coagulated thread bundle width [mm]).

\* \* \* \* \*